(12) United States Patent
Seitz et al.

(10) Patent No.: US 11,003,873 B2
(45) Date of Patent: May 11, 2021

(54) OPTICAL MEASURING SYSTEM AND METHOD

(71) Applicant: Carl Zeiss Industrielle Messtechnik GmbH, Oberkochen (DE)

(72) Inventors: Dominik Seitz, Schwaebisch Gmuend (DE); Tobias Held, Noerdlingen (DE); Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 63 days.

(21) Appl. No.: 16/376,021

(22) Filed: Apr. 5, 2019

(65) Prior Publication Data

US 2019/0311165 A1  Oct. 10, 2019

(30) Foreign Application Priority Data

Apr. 5, 2018 (DE) .................... 10 2018 108 042.5

(51) Int. Cl.
    *G06K 7/10* (2006.01)
    *G06F 16/907* (2019.01)
    *G06K 7/14* (2006.01)

(52) U.S. Cl.
    CPC ....... *G06K 7/10722* (2013.01); *G06F 16/907* (2019.01); *G06K 7/1417* (2013.01)

(58) Field of Classification Search
    CPC . G06K 7/10722; G06K 7/1417; G06F 16/907
(Continued)

(56) References Cited

U.S. PATENT DOCUMENTS

2010/0245576 A1* 9/2010 Inui .......................... G06T 7/80
    348/148
2011/0026014 A1* 2/2011 Mack ..................... G03B 13/22
    356/124
(Continued)

FOREIGN PATENT DOCUMENTS

DE    102013211210 A1   12/2014
DE    102013224930 A1   6/2015

OTHER PUBLICATIONS

Office Action for DE Application No. 10 2018 108 042.5; dated Apr. 5, 2018; 8 pages.
(Continued)

*Primary Examiner* — Paultep Savusdiphol
(74) *Attorney, Agent, or Firm* — Harness, Dickey & Pierce, P.L.C.

(57) ABSTRACT

An optical measuring system includes a calibration apparatus having at least one optical marker and a code. The optical measuring system includes a memory unit that stores a metadata record with calibration parameters that have physical state and change variables that are specific to the calibration apparatus. The calibration apparatus is configured to encrypt a link to the metadata record stored in the memory unit. The optical measuring system includes an optical sensor configured to capture image data containing the at least one optical marker and the code. The optical measuring system includes a control unit configured to evaluate the image data captured by the optical sensor, decrypt the code captured by the optical sensor, access the memory unit via the link, read the metadata record stored therein, and include the read calibration parameters and the at least one optical marker in the evaluation of the image data.

20 Claims, 4 Drawing Sheets

(58) Field of Classification Search
USPC .................................... 235/462.11, 462.41
See application file for complete search history.

(56) References Cited

U.S. PATENT DOCUMENTS

| 2015/0009338 A1 | 1/2015 | Laffargue et al. |
| 2015/0205345 A1* | 7/2015 | Naess .................. G06F 3/0304 |
| | | 345/156 |

OTHER PUBLICATIONS

Utiz et al.; The QR code—current developments and fields of application; 2012; 12 pages.
Keferstein et al.; Manufacturing metrology; Practice-oriented fundamentals, modern measuring methods; 8th edition, completely reworked and extended; Springer Vieweg; 2015; 13 pages.

* cited by examiner

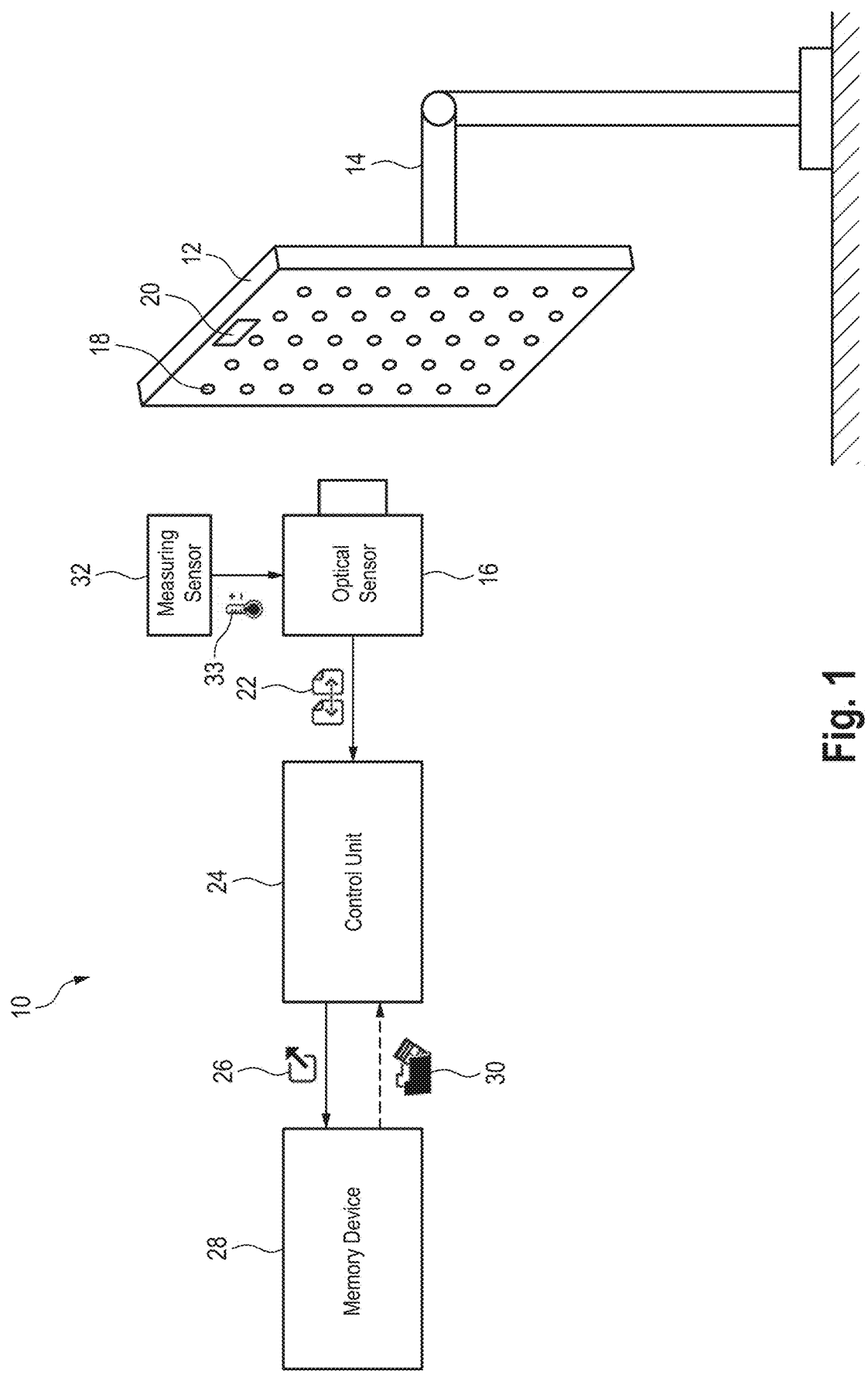

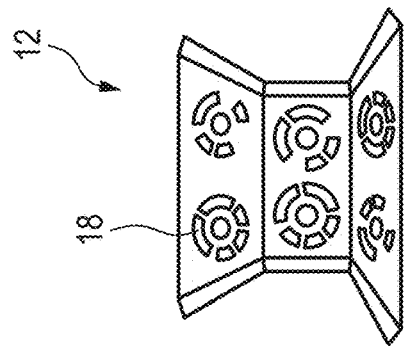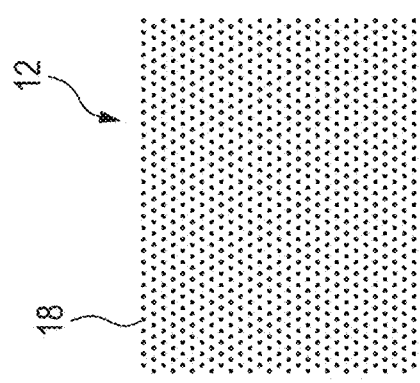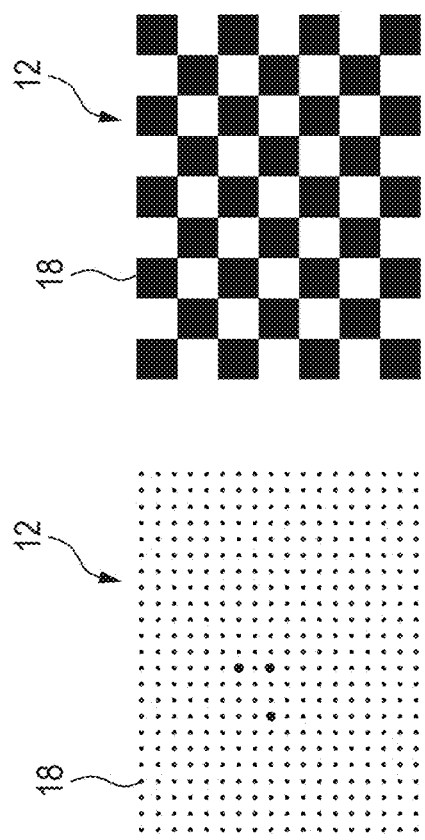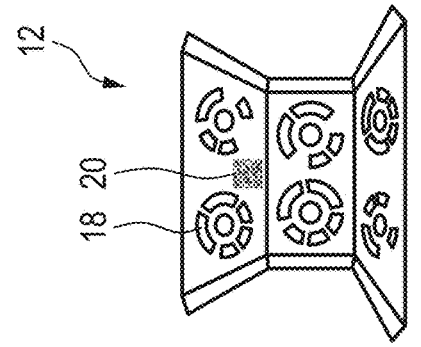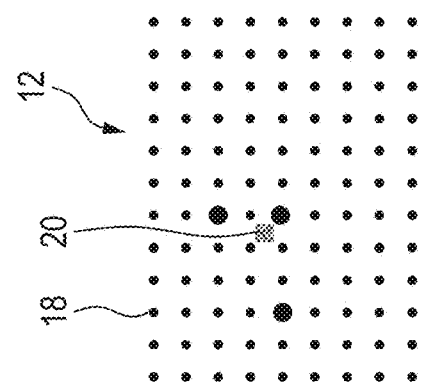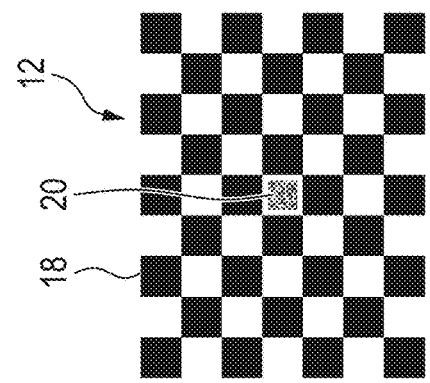

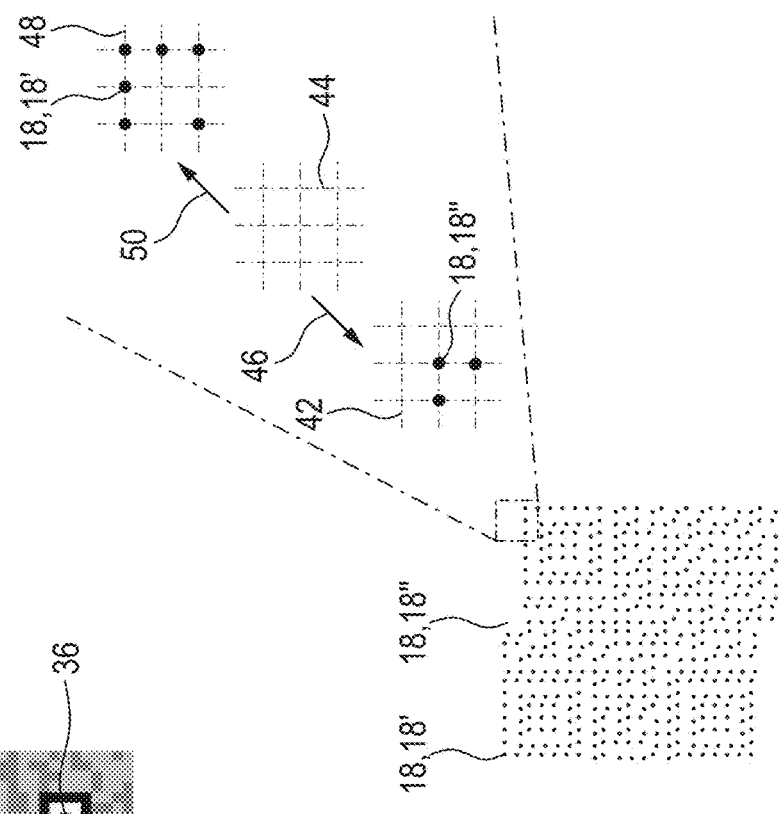
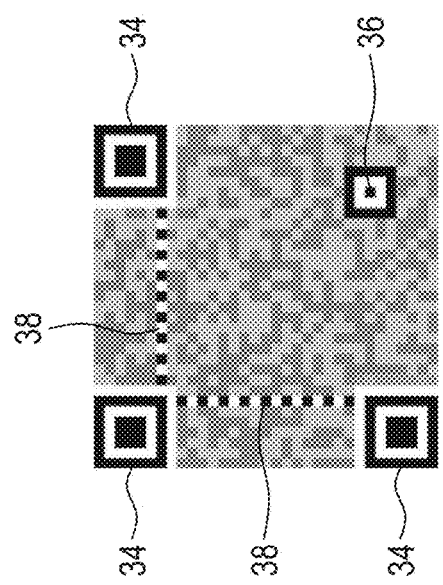
Fig. 4
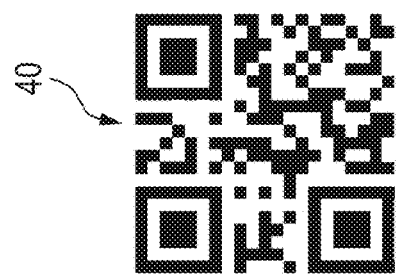
Fig. 5A
Fig. 5B
Fig. 5C
Fig. 5D

OPTICAL MEASURING SYSTEM AND METHOD

CROSS-REFERENCE TO RELATED APPLICATIONS

This application claims priority from German patent application DE 10 2018 108 042.5, filed on Apr. 5, 2018. The entire content of this priority application is incorporated herein by reference.

BACKGROUND OF THE INVENTION

This disclosure relates to an optical measuring system, which has at least one optical sensor for capturing image data and a control unit that is configured to evaluate the captured image data. Further, the present disclosure relates to an optical measuring method for carrying out a calibration or measurement process.

Example optical measuring systems for determining a geometry, a position or a movement of an object are known and represented by so-called multi-camera systems. Optical measuring systems of this type serve to check workpieces, for example as a part of quality assurance, or to determine the geometry of a workpiece completely as a part of what is known as "reverse engineering". This type of optical measuring system is also referred to as a coordinate measuring machine (CMM).

In practice, such optical measuring systems are likewise installed in partly or fully automated assembly lines, too, in order to monitor geometries (forms), positions and/or changes in position of tools and/or workpieces, for example.

A calibration is necessary to ensure proper functioning of the optical measuring system. A self-calibration of the optical sensor is referred to as intrinsic calibration. If an optical measuring system has a plurality of optical sensors, e.g., a multi-camera system, a calibration of the individual optical sensors in relation to one another is moreover necessary. This calibration is referred to as an extrinsic calibration.

Typically, a calibration apparatus is used as a reference object for such a calibration (intrinsic and/or extrinsic calibration). In practice, these calibration apparatuses are also referred to as targets or calibration plates. Capturing the calibration apparatus as a reference object is normally based on an algorithmic evaluation of the captured image data, with the algorithm identifying specific features of the calibration apparatus by way of a comparison with target features. In practice, these specific features are represented by the features of optical markers that are arranged on the calibration apparatus. The position of an optical marker on the calibration apparatus is an example of such a feature.

By way of example, the optical markers can be configured as depressions or bores in a plate. Conventionally, the optical markers are arranged on the calibration apparatus in the form of point patterns or checkerboard patterns (so-called checkerboards), with the point patterns or checkerboard patterns usually being arranged along horizontally and vertically extending, equidistant grid lines.

The optical sensor records one or more optical markers of the calibration apparatus within the scope of the intrinsic calibration. The control unit evaluates the image data supplied by the optical sensor and determines the position of the optical marker (actual position) therefrom. This actual position is subsequently compared by the control unit to the real position (target position) of the optical marker. During the intrinsic calibration, 3-D coordinates of the optical markers are converted into a 2-D projection of these 3-D coordinates. If such a target/actual comparison is repeated for a plurality of optical markers then there is an increase in the accuracy of the intrinsic calibration in comparison with an intrinsic calibration in which the target/actual comparison is only carried out with one optical marker.

In the case of the extrinsic calibration, a relationship of the coordinate system of a first optical sensor is determined in relation to a stationary coordinate system, as a result of which a relative position of the first optical sensor is determinable relative to a position of a second optical sensor. This type of calibration is carried out if the optical measuring system has more than one optical sensor, e.g., in the case of so-called multi-camera systems. In the case of the extrinsic calibration, too, target positions of the optical sensors, known in advance, are compared by the algorithm of the control unit with the actual positions captured by the optical sensors, with the accuracy of the extrinsic calibration increasing with the number of target/actual comparisons.

In practice, a plurality of further parameters in addition to the target/actual comparison of the position of the optical markers are taken into account, by means of which the accuracy of the intrinsic and extrinsic calibration, and hence the accuracy of the measuring or calibration process, is increased. Examples of such additional features can be, inter alia, thermal expansion, rigidity, individual bending, material, weight and/or center of gravity of the employed calibration apparatus. It is also possible to take account of features of the optical markers, such as the form, color and size thereof, for example.

Here, some of these features influence the true position of the optical markers on the calibration apparatus directly. By way of example, a thermal expansion or gravity-induced individual bending of the calibration apparatus leads to a "distortion" of the true position of the optical markers on the calibration apparatus. By way of example, an error in the target/actual comparison of the target/actual position of the optical markers can be corrected by the algorithm of the control unit by taking account of these physical changes.

As a rule, the additional parameters or the specific state and change variables are entered manually into a file by specialist staff for each employed calibration apparatus. Such a file is read by the control unit during a calibration or measurement process and included in the algorithmic evaluation of the image data. Since an individual file is produced for each calibration apparatus and a unique assignment of each file to the respectively associated calibration apparatus needs to be ensured, each file is stored on a separate data medium.

Such a data medium is provided with a readable number or identification, which is also provided on the calibration apparatus belonging to the data medium. The file provided in this way is provided manually by a user by way of entering the readable number or identification into an input window for the control unit. By way of example, the input window is produced by the algorithm, with the entered number or identification being used by the algorithm to include the file with the specific state and change variables contained therein when evaluating the image data.

Independently of the employed optical measuring system or the algorithm, there is the fundamental problem that the manual creation of files that contain the features or the state and change variables specific to the calibration apparatus harbors a significant source of error. By way of example, human errors may occur in the creation of such a file as a result of a lack of concentration or work overload. Such errors, e.g., incorrectly entered features, lead to an incorrect calibration and hence to an incorrect measuring process, as a result of which, for example, the rejection rate of workpieces, and hence the production costs, are increased.

A further source of error is harbored by the assignment of the data media, on which the files are respectively stored in an individual fashion, to the respectively associated calibration apparatus since errors likewise caused by humans may arise during the comparison of the readable numbers or identifications. Here, an incorrect assignment between a file and a calibration apparatus may arise, for example. Such an incorrect assignment likewise leads to an incorrect calibration and hence to an incorrect measuring process.

Moreover, the option of automating a calibration or measuring process is lacking as a result of the manual production of the file and the manual entry of the number or identification into the input window during a calibration process. By way of example, such automation would be very advantageous, particularly when using calibration apparatuses of different types and designs.

SUMMARY OF THE INVENTION

It is an object to provide an optical measuring system and method that facilitate an automation of a calibration process and allow errors caused by a system user to be reduced.

According to an aspect of the present disclosure, an optical measuring system is presented which comprises:

a calibration apparatus having a plurality of optical markers and a code, wherein not the optical markers of the plurality of optical markers themselves but a predefined spatial arrangement of at least two of the plurality of optical markers relative to one another defines the code;

a memory unit storing a metadata record with calibration parameters which are specific to the calibration apparatus, wherein the code is configured to encrypt a link to the metadata record;

an optical sensor configured to capture image data containing the plurality of optical markers; and a control unit configured to determine a position of at least one of the plurality of optical markers based on the image data, decrypt the code, access the memory unit via the link, read the metadata record and correct the determined position of the at least one of the plurality of optical markers based on the calibration parameters.

According to a further aspect of the present disclosure, an optical measuring method is proposed, including the following steps:

providing a calibration apparatus having a plurality of optical markers and a code, wherein not the optical markers of the plurality of optical markers themselves but a predefined spatial arrangement of at least two of the plurality of optical markers relative to one another defines the code;

providing a metadata record with calibration parameters which are specific to the calibration apparatus, wherein the code is configured to encrypt a link to the metadata record;

capturing image data containing the plurality of optical markers;

determining a position of at least one of the plurality of optical markers based on the image data;

decrypting the code;

accessing the metadata record via the link;

reading the calibration parameters contained in the metadata record; and correcting the determined position of the at least one of the plurality of optical markers based on the calibration parameters.

The control unit analytically processes the calibration parameters, e.g. specific state and change variables, during the evaluation of the image data. By way of example, this can be realized by using a calibration parameter as a constant in a differential equation.

As a result of the proposed solution, the control unit automatically accesses the metadata belonging to the calibration apparatus, as a result of which the manual entry of a number or identification for calling a file by a system user is dispensed with. This automation step is facilitated by virtue of the control unit likewise receiving the information items about the link encrypted in the code from the optical sensor in addition to the image data of the optical markers, said information items facilitating an access to the metadata record. To this end, the algorithm employed in the control unit for evaluating the image data is extended to the effect of rendering possible an identification and decryption of the code. By way of example a reference image of the code (target code) can be stored in the algorithm of the control unit, said reference image being compared to the code (actual code) captured by the optical sensor. The code is decrypted if the actual code corresponds to the target code.

The metadata record may include the same information items or calibration parameters as the files of conventional optical measuring systems already mentioned at the outset.

A predefined relative arrangement of two or more optical markers may act as the code which encrypts information containing the link or else a serial number, for example, by means of which the metadata record (but also a file a database entry, for example) which contains all additional information items for the calibration and/or measurement process can be loaded.

A further advantage of the herein presented solution consists of avoiding assignment errors between the files and calibration apparatuses. Hence, it is possible, for example, to automate systems in which use is made of a plurality of different calibration apparatuses with different physical properties and hence also with different calibration parameters. Here, the algorithm stored in the control unit can be extended to the effect of being able to decrypt a plurality of different codes for the plurality of different calibration apparatuses.

An advantage likewise arising from the herein presented solution is that the calibration parameters stored in the metadata record are subsequently modifiable by a system user, or else in fully automated fashion. For example, when state and/or change variables subsequently change or further parameters are taken into account. This simplifies the automation of the calibration process as it is not necessary—as is conventional, as a rule—to change a single specific data record for an associated calibration apparatus but because such a change is performable in centralized fashion.

A further advantage arises from the option of also capturing information items in relation to the type of optical markers in the metadata record in addition to the specific physical state and change variables of the calibration apparatus. Here it is possible, for example, to capture the exact configuration of the optical markers, i.e., for example, the color, form and/or size thereof, as a result of which the algorithm of the control unit can be configured to be at least partly independent of the employed type of markers. This is advantageous, in particular, in the case of optical measuring systems in which different calibration apparatuses are used with different optical markers since the algorithm can obtain the respectively required information item from the respective metadata record of the respective calibration apparatus.

Moreover, it is possible to capture information items about algorithm to be employed of the control unit in the metadata record. Specifically, this is advantageous in that possible partial progressions of the algorithm that are specific to the calibration apparatus can be transferred, as a result of which the main algorithm is simplified to the effect of only calling instructions having to be stored at the respective points. Thus, it is not necessary to extend or modify the algorithm for each configuration of the calibration apparatus.

The optical measuring system can find use in an optical measuring process. In such a measuring process, the position of the calibration apparatus, which is known from the calibration process, is captured by the optical sensor and this can be used, for example by the optical measuring system, when tracking a relative movement of a tool relative to a stationary tool table. Two calibration apparatuses are preferably used in such an application, a first calibration apparatus that is arranged on the tool table and a second calibration apparatus that is arranged on the tool. Consequently, a moving object can be tracked indirectly by way of the relative movement of the two calibration apparatuses relative to one another.

The control unit is configured to determine a position of the plurality of optical markers from the image data and correct the determined position with the aid of the calibration parameters.

The control unit compares a target position of the at least one optical marker with the actual position thereof, which is captured by the optical sensor. In this comparison, the calibration parameters of the calibration apparatus are used, for example, to take account of various physical parameters when evaluating the actual position, as a result of which it is possible to increase the accuracy of the calibration and hence increase the accuracy of the subsequent measuring process.

According to a further aspect of the present disclosure, an optical measuring system is presented which comprises:

a calibration apparatus having at least one optical marker and a code;

a memory unit storing a metadata record with calibration variables which are specific to the calibration apparatus and which depend from ambient parameters, wherein the code is configured to encrypt a link to the metadata record;

an optical sensor configured to capture image data containing the at least one optical marker;

a measuring sensor configured to detect the ambient parameters; and a control unit configured to determine a position of the at least one optical marker based on the image data, decrypt the code, access the memory unit via the link, read the metadata record, determine calibration values based on the calibration variables and the detected ambient parameters, and correct the determined position of the at least one optical marker based on the determined calibration values.

The measurement sensor can be realized by a temperature sensor, for example, the latter capturing an ambient temperature and making this parameter available to the control unit for calculation of temperature-dependent change variables, e.g., thermal expansion. In addition to the ambient temperature, capturing an ambient pressure and/or an ambient humidity can also be realized by a multi-sensor.

The information items contained in the metadata record, e.g., calibration variable for the calibration apparatus, are used or included in the evaluation or analysis of the image data by the algorithm of the control unit. Here, specific physical state and change variables of the calibration apparatus, for example, are taken into account. The calibration variables preferably comprise information items about material, temperature assignment, thermal expansion or expansion, individual bending or bending, weight, center of gravity and general structure properties of the calibration apparatus. Since these information items depend at least in part on ambient conditions, which may be subject to change in relation to standardized conditions (e.g., standard conditions pursuant to DIN 1343) under certain circumstances, the optical measuring system may have a measuring sensor, configured to record ambient parameters (e.g., pressure, temperature and/or humidity) and transfer these to the control unit.

The advantage of this consists of ambient parameters captured by the measuring sensor being able to be taken into account directly when calculating the change variables, i.e. determining the calibration values based on the calibration variables and the detected ambient parameters. Consequently, changes in the actual position of the optical markers that are due to the environment are taken into account directly when evaluating the image data.

According to a still further aspect of the present disclosure, an optical measuring method is proposed, including the following steps:

providing a calibration apparatus having at least one optical marker and a code;

providing a metadata record with calibration variables which are specific to the calibration apparatus and which depend from ambient parameters, wherein the code is configured to encrypt a link to the metadata record;

capturing image data containing the at least one optical marker;

detecting the ambient parameters;

determining a position of the at least one optical marker based on the image data;

decrypting the code;

accessing the metadata record via the link;

reading the metadata record;

determining calibration values based on the calibration variables and the detected ambient parameters; and correcting the determined position of the at least one optical marker based on the determined calibration values.

According to a refinement, the at least one optical marker comprises a plurality of optical markers.

Thus, the calibration apparatus comprises a plurality of optical markers in this case. In practice, this can be realized, for example, by a plurality of drilled holes in a plate, with each individual drilled hole acting as an optical marker.

This refinement is advantageous in that the plurality of optical markers can be captured by the optical sensor during a calibration or measuring process, as a result of which the accuracy of the calibration process is increased.

According to a further refinement, the code is configured as a machine-readable optical label such as a one-dimensional barcode or a two-dimensional barcode (also referred to as a matrix code). One variety of matrix codes is referred to as a quick response (QR) code. In various implementations, the QR code may be defined by standard ISO/IEC 18004:2006 or standard ISO/IEC 18004:2015.

This is advantageous in that these employed types of codes are known from practice and already used in a plurality of fields of application, as a result of which a fault-free functionality is ensured.

Reference is made here to the fact that any type of coding to be captured optically, which is not listed here, can be used in the optical measuring system without departing from the spirit and scope of the present disclosure.

According to a further refinement, the code and the at least one optical marker are arranged next to one another and the code does not overlap with the at least one optical marker.

This refinement is advantageous in that the optical sensor can unambiguously delimit the code from the at least one optical marker. For the purposes of the optical sensor capturing the code as easily as possible, the algorithm can be extended by a code reference image for a target/actual comparison with the code of the calibration apparatus. As a result, it is possible, for example, to complement already existing optical measuring systems by such a code of the calibration apparatus and an extension of the algorithm of the control unit during retrofitting, as a result of which subsequent automation is possible.

According to a further refinement, one of the optical markers of the plurality of optical markers forms the code or contains the latter.

That is to say that the configuration of one of the optical markers is modified to the effect of this change being able to be captured by the optical sensor and being able to be read by the control unit as a code. That is to say, the optical marker is evaluated not only as an optical marker but also as a code or a code reference by the control unit. By way of example, the modification of the optical marker can be realized by coloring said marker. The control unit can identify the optical marker on the basis of known evaluation methods.

Moreover, it is possible for the modified optical marker only to have a reference function to a code situated next to the optical marker, for example. That is to say, the modified optical marker can serve as a reference to the control unit in order to identify a number situated next to the modified optical marker and read said number, with this number representing the code in this case.

This refinement offers the advantage that only one optical marker of the calibration apparatus needs to be modified in terms of its configuration, leading to little work outlay in the case of retrofitting, in particular. Even though only a restricted number of codes are representable by the restricted number of optical markers, this refinement can likewise realize the functionality according to the present disclosure, in which the control unit reads the optical marker as a code or code reference by way of the optical sensor and accesses a link to the metadata record of the memory unit by way of said code or code reference.

A further advantage of this refinement is that the algorithm of the control unit need only be complemented by one query condition. Expressed differently, that is to say that no further detection algorithm other than the one used in any case for calculating the position of the calibration apparatus is necessary.

According to a further refinement, the plurality of optical markers forms the code.

That is to say that the optical markers have the properties of the optical markers and the properties of the code at the same time. Thus, expressed differently, each optical marker has, on its own, the properties of an optical marker and, moreover, a group of the optical markers or the totality of all optical markers forms the code. Consequently, there is no additional code arranged on the calibration apparatus; instead, the code is formed by the plurality of optical markers.

This is advantageous in that an arrangement of an additional code on the calibration apparatus is unnecessary; this is particularly space-saving in relation to the arrangement on the calibration apparatus. Consequently, the optical markers can have a comparatively larger configuration, as a result of which the accuracy of the capture by the optical sensor is increased. In practice, a target/actual comparison of the algorithm of the control unit can consequently be extended by the additional properties of the code.

According to a further refinement, the code formed by the plurality of optical markers has properties of a QR code. For example, these properties may be some or all of the properties specified by standard ISO/IEC 18004:2006 or standard ISO/IEC 18004:2015.

This means that each individual optical marker forms part of a code that is similar to QR code, with each optical marker on its own nevertheless representing the properties of an optical marker.

An advantage arising therefrom is that properties of a QR code known from practice and conventional analysis methods for decrypting the QR code are applicable to the code that is similar to the QR code, even though this code that is similar to the QR code is formed by the plurality of optical markers and does not correspond to a "conventional" QR code within this meaning.

According to a further refinement, the code formed by the plurality of optical markers has at least two positioning marks, at least one orientation mark and at least one synchronization mark.

These properties count as necessary criteria on which the functionality and decryption of a QR code are based. Should a QR code be used as encryption, such a code must have at least these three properties. These properties are taken into account when configuring the code that is similar to a QR code, which is formed by the plurality of optical markers.

In practice, QR codes have the form of a square. At least two (however, as a rule, this is three) of four corners of the square form have a certain identification feature, which is referred to as positioning mark. These positioning marks serve to delimit a square field that is captured by the optical sensor, within which field the QR code is situated. The at least one corner without such a positioning mark has an orientation mark, by means of which a control unit can capture the orientation of the code by way of the optical sensor. With increasing data size to be encrypted, the QR code may also have a plurality of such positioning marks. A straight line extends between two respective positioning marks, said straight line serving as a synchronization mark. Thus, a QR code with three positioning marks has respectively one vertical and one horizontal synchronization mark.

An encryption of data is realized by a black/white pixel contrast in the QR code. This black/white pixel contrast in this case represents the binary memory units 0 and 1, these representing the data storage in electromagnetic form. Moreover, the data encrypted in the QR code are present in redundant form.

That is to say, capture and decryption of the encrypted data is ensured, even in the case of partial coverage of the code by a shadow or an object, for example.

According to a further refinement, the plurality of optical markers contain markers of a first type and markers of a second type, wherein the markers of the first type differ from the markers of the second type in terms of size, color and/or form.

In this refinement, the black/white pixel contrast of the QR code or of the code that is similar to a QR code can be replaced by any two differing markers of the first type and markers of the second type. Here, the markers of the first type represent the white pixels, for example; the markers of the second type represent the black pixels. That is to say, the bipolarity of the bits (0 and 1) is mapped, wherein the markers of the first type and the markers of the second type may have two types of information items. By way of example, these information items can be represented by two different sizes of the markers of the first type and the markers of the second type. A color choice of the markers of the first type and the markers of the second type is also possible, for example green and black or red and blue. Moreover, the form of the markers of the first type can be modified in relation to the form of the markers of the second type. Specifically, this means that the markers of the first type can be configured as circles, for example, and the markers of the second type can be configured as quadrilaterals, for example. It is understood that any other type of configuration and variation of the size, color and/or form may be realized.

According to a further refinement, the plurality of optical markers contain markers of the first type and markers of the second type, wherein the markers of the first type are arranged along a first grid and the markers of the second type are arranged along a second grid and wherein the first grid is offset in relation to the second grid.

To the observer, this offset appears like a distortion in an equidistant grid. In this configuration, two equidistant grids are each displaced in relation to common initial position, with the displacement of the two grids being implemented in two different directions. Two different information items can likewise be stored by way of the deviation of the two grids from the initial position. Here, the respective offset is captured by the optical sensor and converted into the respective present information item in the control unit. From this, too, a code that is similar to a QR code can consequently be produced with the aid of the optical markers. This refinement can also be realized if only one of the two grids is displaced in relation to the initial position.

This refinement is advantageous in that the optical markers can be configured as holes or bores with the same size during the manufacture of a calibration apparatus, for example. Consequently, the calibration apparatus can be manufactured by a fully automated CNC milling machine, for example, without an interchange of a tool becoming necessary. As a result, there is a reduction in the manufacturing outlay for the calibration apparatus in comparison with a calibration apparatus in which, for example, optical markers with two different forms are used.

According to a further refinement, the calibration parameters include information items about material, thermal expansion, individual bending and/or roughness of the calibration apparatus.

As already mentioned previously, these information items are advantageous for capturing the position of the at least one optical marker on the calibration apparatus since this position changes in relation to the position under standard conditions in the case of a change of the ambient parameters (e.g., a temperature increase). Therefore, it is advantageous to take account of such a deviation by the inclusion of in-depth information items.

According to a further refinement, the memory unit is configured as a cloud or server and connected to the control unit.

This type of storage is advantageous in that the totality of encrypted metadata in relation to a plurality of different calibration apparatuses can be stored on only one physical memory unit, as a result of which automation is simplified. Moreover, access to the memory unit is implemented independently of the location of the calibration apparatus since access is possible via the Internet or a company-internal intranet, for example. Moreover, the access to such memory units is known from a plurality of fields of application and can consequently be integrated into the algorithm of the control unit via a standardized procedure.

It is understood that the aforementioned features and those yet to be explained below may be used not only in the respectively specified combination but also in other combinations or on their own, without departing from the spirit and scope of the present disclosure.

BRIEF DESCRIPTION OF THE DRAWINGS

FIG. 1 shows a schematic illustration of an example embodiment of an optical measuring system;

FIG. 2A shows a simple point pattern with an equidistant grid for use in a calibration apparatus;

FIG. 2B shows a checkerboard-type pattern for use in a calibration apparatus;

FIG. 2C shows a point pattern with two mutually offset grids for use in a calibration apparatus;

FIG. 2D shows a calibration apparatus with a grayscale;

FIG. 3A shows example positioning of a code according to an embodiment;

FIG. 3B shows example positioning of a code according to another embodiment;

FIG. 3C shows example positioning of a code according to yet another embodiment;

FIG. 4 shows an example illustration of properties of a QR code;

FIG. 5A shows a QR code;

FIG. 5B is an example embodiment of a code that has properties of a QR code and is formed by a plurality of optical markers;

FIG. 5C is an example embodiment of a code that has properties of a QR code and is formed by a plurality of optical markers;

FIG. 5D is an example embodiment of a code that has properties of a QR code and is formed by a plurality of optical markers;

DETAILED DESCRIPTION OF THE INVENTION

Figures 6A, 6B, 6C:
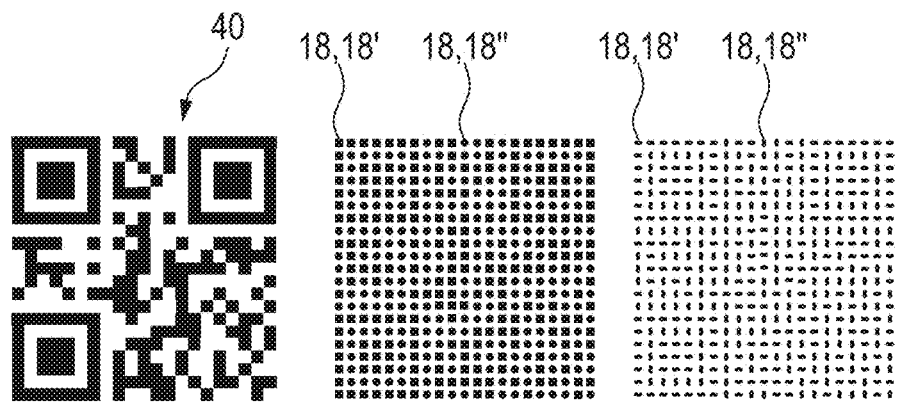
FIG. 6A shows a QR code.
FIG. 6B is an example embodiment of a code that has properties of a QR code and is formed by a plurality of optical markers.
FIG. 6C is an example embodiment of a code that has properties of a QR code and is formed by a plurality of optical markers.

The optical measuring system is indicated in its entirety by reference number 10 in the figures. A component of the optical measuring system 10, which is referred to as calibration apparatus 12 in the present case, is arranged on an arm of a robot 14 in the example illustrated in FIG. 1, the calibration apparatus 12 having an aluminum plate, for example. In practice, such a plate can be manufactured from a plurality of materials, wherein various metals, plastics or ceramics are used, depending on the application.

According to FIG. 1, the calibration apparatus 12 is aligned on an optical sensor 16, by means of which the calibration apparatus 12 is captured optically. By way of example, the optical sensor 16 is a camera.

When capturing the calibration apparatus 12, the optical sensor 16 orients itself using at least one optical marker 18. In the illustrated application (FIG. 1), the at least one optical marker 18 is configured as a bore in the aluminum plate of the calibration apparatus 12. In the present illustrated example, the calibration apparatus 12 has a plurality of these optical markers 18. In FIG. 1, the plurality of optical markers 18 are, in example fashion, a plurality of identical bores along an equidistant grid on the calibration apparatus 12. Often, the optical markers 18 are also referred to as object points.

The calibration apparatus 12 has a code 20 in addition to the plurality of optical markers 18. In the shown application, the code 20 is arranged on the calibration apparatus 12 above the optical markers 18 and captured together with the optical markers 18 by the optical sensor 16. During the capture of the calibration apparatus 12 by the optical sensor 16, 3-D position data, as are present in reality, are converted into 2-D projections and transmitted in the form of image data 22 to a control unit 24. The transmission or transfer of the image data 22 from the optical sensor 16 to the control unit 24 is implemented either by way of one or more cables or by means of a wireless connection.

For a correct functionality of the optical measuring system 10, the positioning of the optical sensor 16 at a "correct" distance from the calibration apparatus 12 should also be taken into account in addition to the mandatory calibration. The optical sensor 16 should be positioned in such a way that the distance between the optical sensor 16 and the calibration apparatus 12 lies within a defined working volume which may be defined, for example, by the focus of the optical sensor 16, within which the optical sensor 16 facilitates an error-free capture and transmission of the image data 22 to the control unit 24. The distance of the optical sensor 16 from the at least one optical marker 18, in particular, should be taken into account because the at least one optical marker 18 cannot be captured accurately if the latter lies outside of the working volume of the optical sensor 16.

The control unit 24 is preferably a computing unit, i.e., for example, a computer or part of a computer. By way of example, use can also be made of a microcontroller, field programmable gate array (FPGA) or system-on-a-chip (SoC). The control unit 24 contains hardware, e.g., a semiconductor-based microchip, on which software that serves to evaluate the image data 22 supplied by the optical sensor 16 is installed. By way of example, the software is the algorithm of the control unit 24.

The control unit 24 is configured to evaluate the image data 22 captured by the optical sensor 16. Here, the evaluation of the image data 22, which contain information items about the at least one optical marker 18 and the code 20, is implemented by an algorithm saved in the control unit 24. This algorithm, which is also referred to as detection algorithm or detection software in practice, is configured to evaluate the image data 22 and decrypt the information items of the code 20 contained therein.

By decrypting the code 20, the control unit 24 can access a memory device 28 via a link 26 and can read a metadata record 30 from the memory unit 28. By way of example, this metadata record 30 may contain information items about the calibration apparatus 12, about the optical markers 18 and/or about the algorithm of the control unit 24. In practice, the metadata record 30 can be realized as a file supplied for the calibration apparatus 12 or as a database entry. The memory unit 28 can be integrated in the control unit 24 or it can have a separate embodiment from the latter.

Here, the memory unit 28 is considered to be any type of physical memory (e.g., hard disks, the storage of a computer center and the like), in which it is possible to store data or metadata in the form of electric or magnetic information items. This also includes any type of "virtual memory" (e.g., cloud or server), for the functionality of which a physical memory or plurality of physical memories is likewise accessed.

The information items contained in the metadata record 30, e.g., calibration parameters for the calibration apparatus, are used or included in the evaluation or analysis of the image data 22 by the algorithm of the control unit 24. Here, specific physical state and change variables of the calibration apparatus 12, for example, are taken into account. The calibration parameters preferably have information items about material, temperature assignment, thermal expansion or expansion, individual bending or bending, weight, center of gravity and general structure properties of the calibration apparatus 12. Since these information items may depend at least in part on ambient conditions, which may be subject to change in relation to standardized conditions (e.g., standard conditions pursuant to DIN 1343) under certain circumstances, the optical sensor 16 may have a measuring sensor 32 (see FIG. 1) configured to record ambient parameters 33 (e.g., pressure, temperature and/or humidity) and transfer these to the control unit 24 via the optical sensor 16.

Here, the measuring sensor 32 is either integrated into the optical sensor 16 or connected to the latter by one or more cables or by means of a wireless connection. In practice, the measuring sensor 32 can be represented by a PT-100 temperature element or by a multi-sensor, for example.

Moreover, capturing further properties of the calibration or the calibration process is possible, said further properties being able to be stored overall in the metadata record 30. Here, the marker polarity, for example, may be saved as a further parameter. In the present case, the marker polarity is understood to mean whether the optical markers 18 are, e.g., black and situated on, e.g., a white background or whether they are white and situated on a black background. Likewise, specifications about the employed type of markers 18 are possible, which is understood to mean, inter alia, the configuration as a circle or checkerboard pattern (checkerboard). The marker search criteria to be chosen may also be saved in the metadata record 30. A calibration time may likewise be saved in the case of time-dependent calibration processes. As a result of this plurality of additional information items, the algorithm of the control unit 24 can be programmed in a more general form and can access all additional information items that are required for a specific calibration process by using the metadata record 30.

Figure 7:
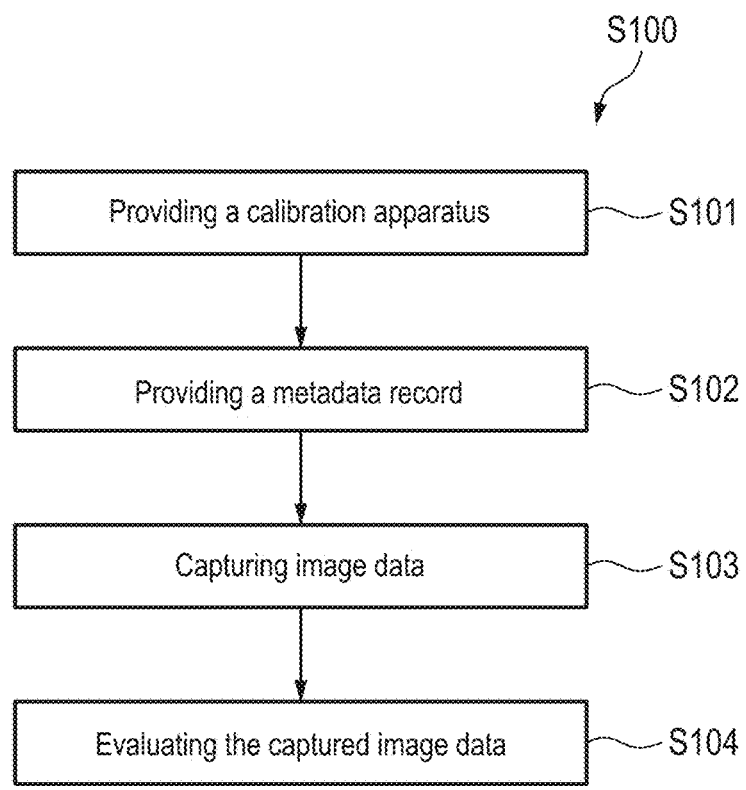
FIG. 7 shows an example procedure of the optical measuring method according to an embodiment.

In conclusion, the optical measuring system 10 carries out the following method steps (see FIG. 7) of an optical measuring method S100 during the calibration process: providing a calibration apparatus S101, followed by providing a metadata record S102, followed by capturing image data S103 and evaluating the captured image data S104. Consequently, the information items about the optical markers 18 and the code 20 provided by the calibration apparatus 12 can be captured in the form of image data 22. This is followed by decryption of the code 20, in which the link 26 to the provided metadata record 30 is encrypted. Here, the metadata record 30 is accessed via the link 26 and said metadata record is read, when the metadata record 30 has specific calibration parameters for the calibration apparatus 12. The read calibration parameters are included in the evaluation of the image data 22.

In an example fashion, FIG. 2 shows four calibration apparatuses 12 known from practice in a plan view, the calibration apparatuses 12 illustrated in FIGS. 2A and 2C also being referred to as calibration plates or targets. FIG. 2B shows a calibration apparatus 12 that is usually referred to as a checkerboard. In FIG. 2D, the calibration apparatus 12 is illustrated as a "complex" body, with a "complex" body being understood here to mean a body that deviates from conventional forms such as a cube, a cuboid or a sphere, for example.

The calibration apparatuses 12 illustrated in FIGS. 2A-2D each have a plurality of optical markers 18 in different configurations. In FIGS. 2A and 2C, the optical markers 18 are black circles on a white background. In practice, the circles can be realized either by punctiform black coloring or by bores in an aluminum plate, for example. Likewise, the optical markers 18 can be also realized as, for example, black squares on a white background in a checkerboard-like arrangement (see FIG. 2B). In addition to these "simple" forms (e.g., circles and squares), any other form and configuration option is conceivable, the features of which clearly delimit the optical markers 18 from the background of the calibration apparatus 12. By way of example, these also include more complex representations of the optical markers 18, such as, for example, the white circular segments on a black background (see FIG. 2D).

One of the arrangements of the code 20 on the calibration apparatus 12, as already described above, is implemented by arranging the code 20 between, or next to, the optical markers 18, as illustrated in example fashion in FIG. 1 and for three further example embodiments of the calibration apparatus 12 in FIGS. 3A-3C. In FIGS. 3A-3C, the code 20 is arranged between four optical markers 18 in each case, wherein the code 20 at no point overlaps or covers the area on the calibration apparatus 12 claimed by the four optical markers 18. As a result, the optical markers 18 can continue to be captured by the optical sensor 16 as optical markers 18, without this capture being disturbed or even prevented by the code 20. In the example illustrations of FIGS. 3A-3C, the code 20 is a QR code known from practice. However, any other type of encoding is employable, for example barcodes, matrix codes or, in the simplest case, a serial number or other identification number, which can be captured by the optical sensor 16 and decrypted by the control unit 24 and which consequently releases the link 26 to the memory unit 28.

A further option for arranging the code 20 on the calibration apparatus 12 is given by virtue of the at least one optical marker 18 being represented by a plurality of optical markers 18, which form the code 20 in the totality thereof. Preferably, the code 20 formed by the plurality of optical markers 18 is a code 20 that is similar to a QR code. That is to say that the code 20 has the properties necessary for the functionality of a QR code, which are necessary for the error-free decryption of the information items. Here, three properties, in particular, are necessary, which are shown in FIG. 4 on the basis of a QR code known from practice. The code 20 that is similar to a QR code should have at least two positioning marks 34, at least one orientation mark 36 and at least one synchronization mark 38.

The QR code illustrated in FIG. 4 has three positioning marks 34, which are arranged in three of the four corners of the QR code, with respectively two of the positioning marks 34 being connected by way of a synchronization mark 38. In the shown case, the two synchronization marks 38 are represented by a strictly alternating sequence of black and white pixels along a straight line, with one of the two synchronization marks 38 extending in horizontal fashion and the other extending in vertical fashion. The orientation mark 36 is arranged in the fourth corner of the QR code that is not claimed by the three positioning marks 34. The positioning marks 34 set a detection field, within which the encoded information items are situated. The orientation mark 36 allows the optical sensor 16 to determine the orientation or alignment of the code, e.g., the direction in which the information items should be read. The synchronization marks 38 serve the synchronization between the QR code and the optical sensor 16.

In order to map a code 20 that it is similar to a QR code by the plurality of optical markers 18, the polarity of the QR code, i.e., the conventional representation of the binary code information items by black-and-white pixels, can be replaced by two distinguishable features deviating therefrom, which features can be captured without error by the optical sensor 16. This leads to the calibration apparatus 12 having markers of the first type 18' and markers of the second type 18", wherein the markers of the first type 18' together with the markers of the second type 18" represent the plurality of markers 18 that form the code 20. Five example embodiments are illustrated in FIGS. 5B-5D and FIGS. 6B-6C. For improved comparison of the different configuration forms, FIG. 5A and FIG. 6A each illustrate a reference QR code 40 as generally known from practice.

In FIGS. 5B and 5C, the markers of the first type 18' and the markers of the second type 18" have different sizes. Expressed differently, that is to say that the information items of the code 20 are expressed by the radius of the optical markers 18. Here, a radius of the marker of the first type 18' corresponds to a black field in the reference QR code 40, for example; a radius of the marker of the second type 18" corresponds to a white field (see FIG. 5A and FIG. 5B). In FIG. 5C, the provision of information of the black/white information items is reversed in each case.

It is likewise possible to modify the information items to be encrypted by varying the position of the markers of the first type 18' and/or of the markers of the second type 18" in relation to an initial position. As illustrated in FIG. 5D in example fashion, the markers of the first type 18', which are arranged along an equidistant first grid 42, are displaced in a first direction 46 in relation to a position of a reference grid 44. The markers of the second type 18", which are arranged along an equidistant second grid 48, are displaced in a second direction 50 in relation to the position of the reference grid 44. Consequently, the original black/white information items are likewise expressed by these two defined displacements. However, it is also possible only to modify the location or position of the markers of the first type 18' or of the markers of the second type 18" in relation to a reference position or the reference grid 44. By way of example, the location of the optical markers of the first type 18' may remain unchanged for representing the black fields, with the location of the second grid 48 of the optical markers of the second type 18" being displaced by 10 units of length, for example, in the second direction 50 for the purposes of representing the white fields. It should be mentioned here that the direction for the displacement or a final position after the displacement is not subject to any defined direction or distance, and hence it can be chosen freely. All that needs to be ensured is that a relative displacement between the markers of the first type 18' and the markers of the second type 18" is able to be captured by the optical sensor 16.

Moreover, it is possible to represent the information items by varying the form of the optical markers 18, with FIGS. 6B-6C showing two possible example embodiments in this respect. Here, in FIG. 6B, the markers of the first type 18' are embodied as circles and the markers of the second type 18" are embodied as squares. Two elliptic forms as markers of the first type 18' and markers of the second type 18", in which the ratio of the ellipse semi-axes is varied depending on the black/white information item, would be possible (see FIG. 6C).

In a further configuration, one of the optical markers 18 shown in FIG. 2D, for example, may form the code 20 or contain the latter. In this embodiment, the configuration of one of the optical markers 18 has been modified to the effect of this change being able to be captured by the optical sensor 16 and being able to be read by the control unit 24. That is to say, the optical marker 18 acting as a code 20 is evaluated not only as an optical marker 18 but also as a code 20 or a code reference by the control unit 24. By way of example, the modification of the optical marker 18 can be realized by coloring said marker 18. On the basis of known evaluation methods or using detection software, the control unit 24 can identify the optical marker 18 acting as a code 20. For additional labeling, the optical marker 18 acting as a code 20 can be complemented by a number or ID number which, for example, is arranged below the marker 18 and not read by the detection software. The information item in relation to the link 26 of the optical marker 18 can be encoded in the circle segments, for example, since these circle segments can be detected "quicker" and "in more stable fashion" than numbers by the algorithm of the control unit. Alternatively, the identification information, i.e., the link 26, can also be decrypted by way of grayscale value interpolation or by way of a reference image saved in the memory unit 28 and by way of known correlation methods. The metadata 30 made accessible via the link 26 are continuously evaluated in the case of both an intrinsic and extrinsic calibration, and also during the measurement or measurement process.

In this configuration, it is also possible, for example, for a certain information item to be assigned to a certain marker 18, for example by applying a marker ID below the optical marker 18. Such an assignment of the certain information item to the optical marker 18 may, in principle, also be implemented for a plurality of information items in the case of a plurality of optical markers 18, with the number being restricted to <1000 on account of a finite number of optical markers 18, i.e., a finite number of assignable marker IDs. By way of example, an optical marker 18 with a certain marker ID can be defined in such a way that the algorithm only and uniquely relates this marker ID to a calibration apparatus 12, to which a certain function has been assigned within a measurement process (e.g., measuring the workpiece length). In order to render this configuration transparent to the user, such optical markers may be additionally labeled; this may be implemented, for example, by applying a red dot outside of the region used by the algorithm.

In addition or in place of such a unique assignment of the optical markers 18 by a marker ID, for example, it is also possible to use a certain relative arrangement of two or more optical markers 18 in relation to one another, with this defined arrangement of the two or more markers 18 in relation to one another acting as code 20 and the information to be encrypted containing the link 26 or else a serial number, for example, by means of which the metadata record 30 (but also a file a database entry, for example) which contains all additional information items for the calibration and/or measurement process can be loaded.

In an embodiment, in which one of the markers 18 forms the code 20 or refers to the latter, the code 20 can likewise be realized by way of using a so-called black/white inversion, with the black/white inversion in the present case being understood to mean that, for example, a serial number or the marker 18 encoded with the additional information items is always configured in white in front of a black background, with the optical markers 18 without additional information items always being configured in black in front of a white background.

If the optical measuring system 10 has been calibrated, i.e., if the position of the calibration apparatus 12 has been captured, the latter can be tracked and/or measured by the optical measuring system 10, for example when tracking a relative movement of a tool relative to a stationary tool table. In such a case, a calibration apparatus 12 is respectively attached to both the tool table and the tool. Consequently, objects moved in practice during a work process can be tracked. A further example lies in, for example, positioning the calibration apparatus 12 on a tool center point, a sensor or a robot arm, with the latter already having been shown in FIG. 1. In addition to these example use purposes, a plurality of other applications of the optical measuring system 10 are possible, the functions or functionality of which may be activated by the algorithm of the control unit 24, for example by way of additional information items saved in the metadata record 30.

Here, the following additional information items, which are loaded, e.g., as calling commands by the algorithm and which contain functions that are performable by the calibration apparatus 12, may be called in the metadata record 30:

Function call for various correction functions: Information items for temperature correction are available with the additional information items (expansion, temperature, measuring sensor assignment, dimensions). If optical markers or reference object points are available, these can be corrected therewith. Using an information item about centers of gravity and weight, it is possible to carry out an elastic deformation correction if a calibration time is contained or if reference is made thereto.

Function call for the functional assignment: The additional information items are complemented by a functional assignment. A distinction is made according to, e.g., usability of an intrinsic or extrinsic calibration, tracking or ascertainment of a workpiece length, tracking of a tool (in or at the tool center point (TCP)), setting of an inertial system. If the functional assignment is known by way of the code, the software can offer possible actions to the user via an interface, e.g., a PC or a GUI. In principle, the functions can be continuously identified in automatic fashion. However, this is not always expedient. Preferably, there is a mode in which the optical sensor attempts to identify the function of calibration apparatuses. The data are loaded and processed in said mode. This mode is left once one or more calibration apparatuses were identified and an action was subsequently carried out automatically or after the user interaction e.g., in the case of a CNC-controlled measuring process. If the visual contact to a required calibration apparatus is lost during the subsequent action, this mode can be reactivated until the corresponding calibration apparatus reappears. The user can be warned in the meantime.

Function call according to the type of calibration: If a calibration apparatus that is suitable for an intrinsic or extrinsic calibration is identified, the algorithm of the control unit can offer the user a selection of the possible calibration functions. This may also be implemented completely automatically, i.e., without user interaction. If the calibration apparatus is fastened to a habitually movable appliance, for example, a movement sequence that is predetermined for the function can be carried out, for example after a user selection or else in fully automated fashion.

Workpiece length function call: If a calibration apparatus that is assigned to a workpiece is identified, the length of the latter can be determined and used. Additionally, a movement sequence or, more generally, a program assigned to a work piece can be started. Here, the coding may refer specifically to a very specific workpiece (batch, individual or, also generally, to described possible workpieces). In the latter case, the optical measuring system (camera system) that is present in any case may additionally also be used to identify the workpiece type. Once the workpiece type has been identified, a suitable program (e.g., a CNC measuring process) can be searched for and offered, or started straight away.

Inertial system function call: If a calibration apparatus for the inertial system function is identified, all other present positions of the calibration apparatus can be automatically transferred into this system. An unwanted shift of the optical measuring system relative to the inertial system (e.g., temperature drift) is automatically corrected therewith. Alternatively, it can be used to capture this unwanted shift and correct the latter in the corresponding coordinate systems of the workpiece and/or TCP by transformation. If more than one such calibration apparatus with an inertial system function assignment is identified at the same time, an error message or a selection can be displayed to the user. In the latter case, the calculation is continued with the selected target.

Tool center point function call: If a calibration apparatus for the TCP function is identified, the location of the TCP can be selectively transferred into the inertial system or into the workpiece system. In the case of a movement, this can be implemented continuously in an automatic fashion. This information item can be used for updating (tool on the TCP) or measuring (transformation of sensor data into workpiece coordinates) purposes. If the information items on the codes also contain an individual assignment (e.g., sensor serial number, etc.), calibration or correction data can be loaded automatically or by way of a user dialogue once the calibration apparatus is identified. This relates, in particular, to the location of an individual optical sensor or tool relative to the calibration apparatus. These data may also be contained directly in the code and may be loaded in fully automated fashion.

Multifunction function call: A calibration apparatus may be suitable for a plurality of functions, e.g., TCP and extrinsic calibration. In this case, a selection may be offered to the user. A preference may also be offered for the automated identification. By way of example, TCPs are always assumed in an automated mode; a selection is only overlaid in an interactive mode.

As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An optical measuring system, comprising:
a calibration apparatus having a plurality of optical markers, wherein a predefined spatial arrangement of at least two of the plurality of optical markers relative to one another defines a code;
a memory unit storing a metadata record with calibration parameters that are specific to the calibration apparatus, wherein the code is configured to encrypt a link to the metadata record;
an optical sensor configured to capture image data containing the plurality of optical markers; and
a control unit configured to:
determine positions of at least two of the plurality of optical markers based on the image data,
decrypt the code by analyzing the determined positions of the at least two of the plurality of optical markers relative to one another,
access the memory unit via the link,
read the metadata record, and
correct at least one of the determined positions based on the calibration parameters.

2. The optical measuring system of claim 1, further comprising a measuring sensor configured to detect an ambient parameter, wherein the control unit is configured to correct the determined position of the at least one of the plurality of optical markers based on the calibration parameters and the ambient parameter.

3. The optical measuring system of claim 1, wherein each of the plurality of optical markers has properties of a QR code.

4. The optical measuring system of claim 3, wherein, for each of the plurality of optical markers, the QR code has at least two positioning marks, at least one orientation mark, and at least one synchronization mark.

5. The optical measuring system of claim 1, wherein:
the plurality of optical markers comprises markers of a first type and markers of a second type, and
the markers of the first type differ from the markers of the second type in terms of at least one of size, color, and form.

6. The optical measuring system of claim 1, wherein:
the plurality of optical markers comprises markers of a first type and markers of a second type,
the markers of the first type are arranged along a first grid,
the markers of the second type are arranged along a second grid, and
the first grid is arranged spatially offset in relation to the second grid.

7. The optical measuring system of claim 1, wherein the calibration parameters include information about at least one of material, thermal expansion, individual bending, and roughness of the calibration apparatus.

8. The optical measuring system of claim 1, wherein the memory unit comprises at least one of a cloud server and a terminal server.

9. An optical measuring method comprising:
providing a calibration apparatus having a plurality of optical markers, wherein a predefined spatial arrangement of at least two of the plurality of optical markers relative to one another defines a code;
providing a metadata record with calibration parameters that are specific to the calibration apparatus, wherein the code is configured to encrypt a link to the metadata record;
capturing image data containing the plurality of optical markers;
determining positions of at least two of the plurality of optical markers based on the image data;
decrypting the code by analyzing the determined positions of the at least two of the plurality of optical markers relative to one another;
accessing the metadata record via the link;
reading the calibration parameters contained in the metadata record; and
correcting at least one of the determined positions based on the calibration parameters.

10. An optical measuring system, comprising:
a calibration apparatus having at least one optical marker and a code;

a memory unit storing a metadata record with calibration variables that are specific to the calibration apparatus and that depend on an ambient parameter, wherein the code is configured to encrypt a link to the metadata record;

an optical sensor configured to capture image data containing the at least one optical marker;

a measuring sensor configured to detect the ambient parameter, wherein the ambient parameter includes at least one of an ambient temperature parameter, an ambient pressure parameter, and an ambient humidity parameter; and a control unit configured to:
determine a position of the at least one optical marker based on the image data,
decrypt the code,
access the memory unit via the link,
read the metadata record,
determine calibration values based on the calibration variables and the detected ambient parameter, and
correct the determined position of the at least one optical marker based on the determined calibration values.

11. The optical measuring system of claim 10, wherein the code is configured as at least one of a QR code, a matrix code and a barcode.

12. The optical measuring system of claim 10, wherein:
the code and the at least one optical marker are arranged next to one another, and
the code does not overlap with the at least one optical marker.

13. The optical measuring system of claim 10, wherein the at least one optical marker comprises a plurality of optical markers.

14. The optical measuring system of claim 13, wherein at least one of the plurality of optical markers forms the code or contains the code.

15. The optical measuring system of claim 13, wherein the plurality of optical markers forms the code.

16. The optical measuring system of claim 13, wherein each of the plurality of optical markers has properties of a QR code.

17. The optical measuring system of claim 13, wherein:
the plurality of optical markers comprises markers of a first type and markers of a second type, and
the markers of the first type differ from the markers of the second type in terms of at least one of size, color, and form.

18. The optical measuring system of claim 13, wherein:
the plurality of optical markers comprises markers of a first type and markers of a second type,
the markers of the first type are arranged along a first grid,
the markers of the second type are arranged along a second grid, and
the first grid is arranged spatially offset in relation to the second grid.

19. The optical measuring system of claim 10, wherein the calibration variables include information about at least one of material, thermal expansion, individual bending, and roughness of the calibration apparatus.

20. An optical measuring method comprising:
providing a calibration apparatus having at least one optical marker and a code;
providing a metadata record with calibration variables that are specific to the calibration apparatus and that depend on an ambient parameter, wherein the code is configured to encrypt a link to the metadata record;
capturing image data containing the at least one optical marker;
detecting the ambient parameter, wherein the ambient parameter includes at least one of an ambient temperature parameter, an ambient pressure parameter, and an ambient humidity parameter;
determining a position of the at least one optical marker based on the image data;
decrypting the code;
accessing the metadata record via the link;
reading the metadata record;
determining calibration values based on the calibration variables and the detected ambient parameter; and
correcting the determined position of the at least one optical marker based on the determined calibration values.

* * * * *